(12) United States Patent
Cheng

(10) Patent No.: US 9,414,112 B2
(45) Date of Patent: Aug. 9, 2016

(54) TIME SYNCHRONIZATION METHOD AND SYSTEM

(71) Applicant: Primax Electronics Ltd., Neihu, Taipei (TW)

(72) Inventor: Ting-Yuan Cheng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 202 days.

(21) Appl. No.: 14/335,635

(22) Filed: Jul. 18, 2014

(65) Prior Publication Data

US 2015/0304696 A1    Oct. 22, 2015

(30) Foreign Application Priority Data

Apr. 18, 2014  (TW) ............................... 103114189 A

(51) Int. Cl.
| | |
|---|---|
| H04N 5/932 | (2006.01) |
| H04N 5/935 | (2006.01) |
| H04N 21/436 | (2011.01) |
| H04N 21/43 | (2011.01) |

(52) U.S. Cl.
CPC ..... *H04N 21/43615* (2013.01); *H04N 21/4307* (2013.01)

(58) Field of Classification Search
CPC .............................. G06F 1/12; H04N 21/43615
USPC ........................................... 386/201; 709/248
See application file for complete search history.

(56) References Cited

U.S. PATENT DOCUMENTS

| | | | |
|---|---|---|---|
| 2006/0002681 A1* | 1/2006 | Spilo ......................... | H04N 5/76 386/220 |
| 2012/0042047 A1* | 2/2012 | Chen ........................... | G06F 1/12 709/219 |

* cited by examiner

*Primary Examiner* — Hung Dang
*Assistant Examiner* — Girumsew Wendmagegn

(57) ABSTRACT

A time synchronization method is provided. Firstly, an update time of a second playing device is calculated according to a first system time of transmitting a first packet from a first playing device and a second system time of receiving the first packet by the second playing device. Then, a first difference value is calculated according to the first system time of transmitting a second packet from the first playing device and the update time corresponding to the reception of the second packet by the second playing device. If plural first difference values are all smaller than a first predetermined value, a second difference value is calculated. If the second difference value is smaller than a second predetermined value, a synchronization time is obtained according to the second difference value and the update time.

9 Claims, 6 Drawing Sheets

TIME SYNCHRONIZATION METHOD AND SYSTEM

FIELD OF THE INVENTION

The present invention relates to a time synchronization method and a time synchronization system, and more particularly to a time synchronization method and a time synchronization system for synchronizing a first playing device and a second playing device of a local area network.

BACKGROUND OF THE INVENTION

Digital Living Network Alliance (DLNA) is an alliance organization that is composed by the manufacturers of consumer electronics products, mobile phones and computers. The DLNA is responsible for defining unified transmission specifications to allow a variety of products from different manufacturers to communicate with each other. Consequently, the video and audio devices that comply with the DLNA protocol can be in direct communication with each other, make synchronization or even transfer data.

The devices that are operated under the DLNA environment include for example a digital media server (DMS), a digital media controller (DMC) and a digital media renderer (DMR). When plural digital media renderers, a digital media server and a digital media controller are in wireless communication with each other, the plural digital media renderers may receive audio data from the digital media server in a wireless transmission manner and play the audio data. Generally, the plural digital media renderers have respective system clocks. However, these system clocks are not always identical. If the system clocks are different, the audio playback actions of plural digital media renderers cannot be synchronized with each other. Therefore, it is an important issue to synchronize the system clocks of the plural digital media renderers.

Hereinafter, a conventional time synchronization method for synchronizing the system clocks of plural digital media renderers will be illustrated with reference to FIG. 1. FIG. 1 is a flowchart illustrating a conventional time synchronization method.

In a step S1, a packet is firstly broadcasted from a first digital media renderer 10 to a base station 11, and then the packet is broadcasted from the base station 11 to the first digital media renderer 10 and a second digital media renderer 12.

Then, a step S2 and a step S3 are performed. After the packet is received by the second digital media renderer 12, a time point of receiving the packet by the second digital media renderer 12 is recorded into the second digital media renderer 12. Then, the second digital media renderer 12 issues a retrieve request to the first digital media renderer 10 in order to acquire a time point of receiving the packet by the first digital media renderer 10. In response to the retrieve request, the time point of receiving the packet by the first digital media renderer 10 is broadcasted to the second digital media renderer 12.

Then, in a step S4, a time difference between the time point of receiving the packet by the second digital media renderer 12 and the time point of receiving the packet by the first digital media renderer 10 is calculated by the second digital media renderer 12. In a step S5, the time difference is added to or subtracted from the system time of the system clock of the second digital media renderer 12 by the second digital media renderer 12, so that the system time of the system clock of the second digital media renderer 12 is synchronized with the system time of the system clock of the first digital media renderer 10.

As mentioned above, after the time difference between the time points of receiving the same packet by the first digital media renderer 10 and the second digital media renderer 12 is calculated, the second digital media renderer 12 may correct the system time of the system clock thereof. Consequently, the purpose of synchronizing the system time of the system clock of the second digital media renderer 12 with the system time of the system clock of the first digital media renderer 10 will be achieved. However, after the conventional time synchronization method has been implemented for a long term, the error is gradually increased.

Therefore, there is a need of providing an improved time synchronization method in order to overcome the above drawbacks.

SUMMARY OF THE INVENTION

An object of the present invention provides a time synchronization method and a time synchronization system, which are faster and more precise.

In accordance with an aspect of the present invention, there is provided a time synchronization method for synchronizing a first playing device and a second playing device of a local area network. The local area network includes a base station. The first playing device has a first system clock. The second playing device has a second system clock. The time synchronization method includes the following steps. In a step (A), a packet is transmitted from the first playing device to the base station. In a step (B), the packet is transmitted from the base station to the first playing device and the second playing device. In a step (C), an update time is obtained by adding an error value to a system time of the second system clock or subtracting the error value from the system time of the second system clock after the packet is received by the second playing device. The error value is a time difference between a time point of transmitting the packet from the first playing device to the base station and a time point of receiving the packet from the base station by the second playing device. Then, a step (D) is performed to judge whether plural first difference values are all smaller than a first predetermined value. If the plural first difference values are all smaller than the first predetermined value, a step (E) is performed. Each of the first difference values is a time difference between a time point of transmitting the same packet of plural consecutive packets from the first playing device to the base station and a time point of receiving the packet by the second playing device. Moreover, a system time of the first system clock is used by the first playing device, and the update time is used by the second playing device. Then, a step (E) is performed to calculate plural second difference values and judge whether the plural second difference values are all smaller than a second predetermined value. If one of the plural second difference values is smaller than the second predetermined value, a step (F) is performed. Each of the second difference values is a time difference between time points of receiving the same packet from the base station by the first playing device and the second playing device. Moreover, the system time of the first system clock is used by the first playing device, and the update time is used by the second playing device. In a step (F), a synchronization time is obtained by adding the second difference value to the update time or subtracting the second difference value from the update time, so that the system time of the first system clock and the synchronization time are synchronized with each other.

In accordance with another aspect of the present invention, there is provided a time synchronization system for synchronizing a first playing device and a second playing device of a local area network. The local area network includes a base station. The first playing device has a first system clock. The second playing device has a second system clock. The time synchronization system includes the first playing device, the base station, and the second playing device. The first playing device includes a packet transmission module. The packet transmission module transmits plural packets to the base station. The base station transmits the plural packets to the first playing device and the second playing device. The second playing device includes a synchronization module and a computation compensating module. After one of the plural packets is received by the second playing device, an error value is added to or subtracted from a system time of the second system clock by the synchronization module, so that an update time is obtained. The error value is a difference value between a time point of transmitting the packet from the first playing device to the base station and a time point of receiving the packet from the base station by the second playing device. The computation compensating module calculates plural first difference values and judges whether the plural first difference values are all smaller than a first predetermined value. If the plural first difference values are all smaller than the first predetermined value, the computation compensating module calculates plural second difference values and judges whether the plural second difference values are all smaller than a second predetermined value. If one of the plural second difference values is smaller than the second predetermined value, the second difference value is added to or subtracted from the update time by synchronization module, so that a synchronization time is obtained and a system time of the first system clock is synchronized with the synchronization time. Each of the first difference values is a time difference between a time point of transmitting the same packet of the plural consecutive packets from the first playing device to the base station and a time point of receiving the packet by the second playing device. Moreover, each of the second difference values is a time difference between time points of receiving the same packet from the base station by the first playing device and the second playing device. The system time of the first system clock is used by the first playing device, and the update time is used by the second playing device.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
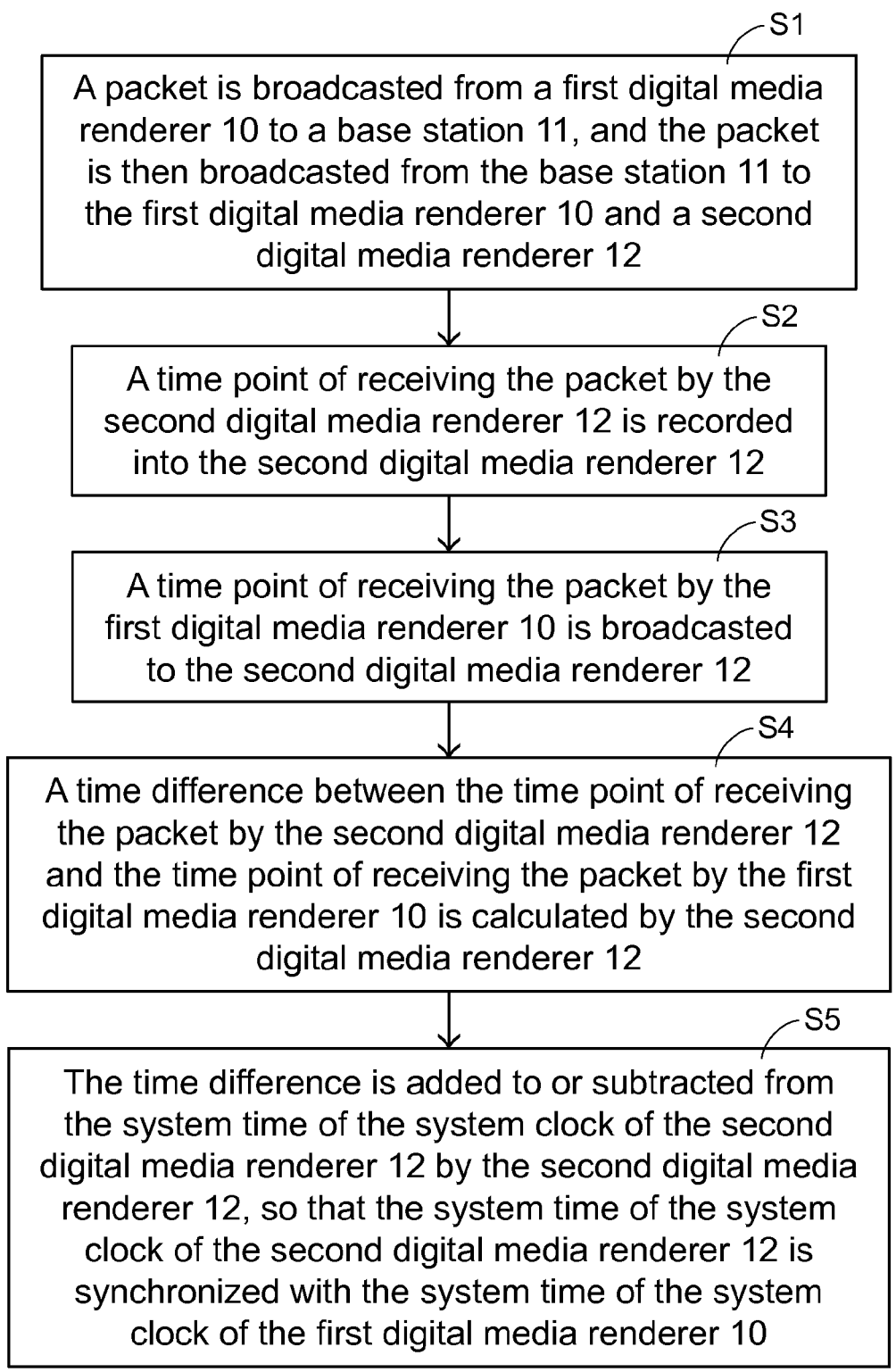
FIG. 1 is a flowchart illustrating a conventional time synchronization method.
Figure 2:
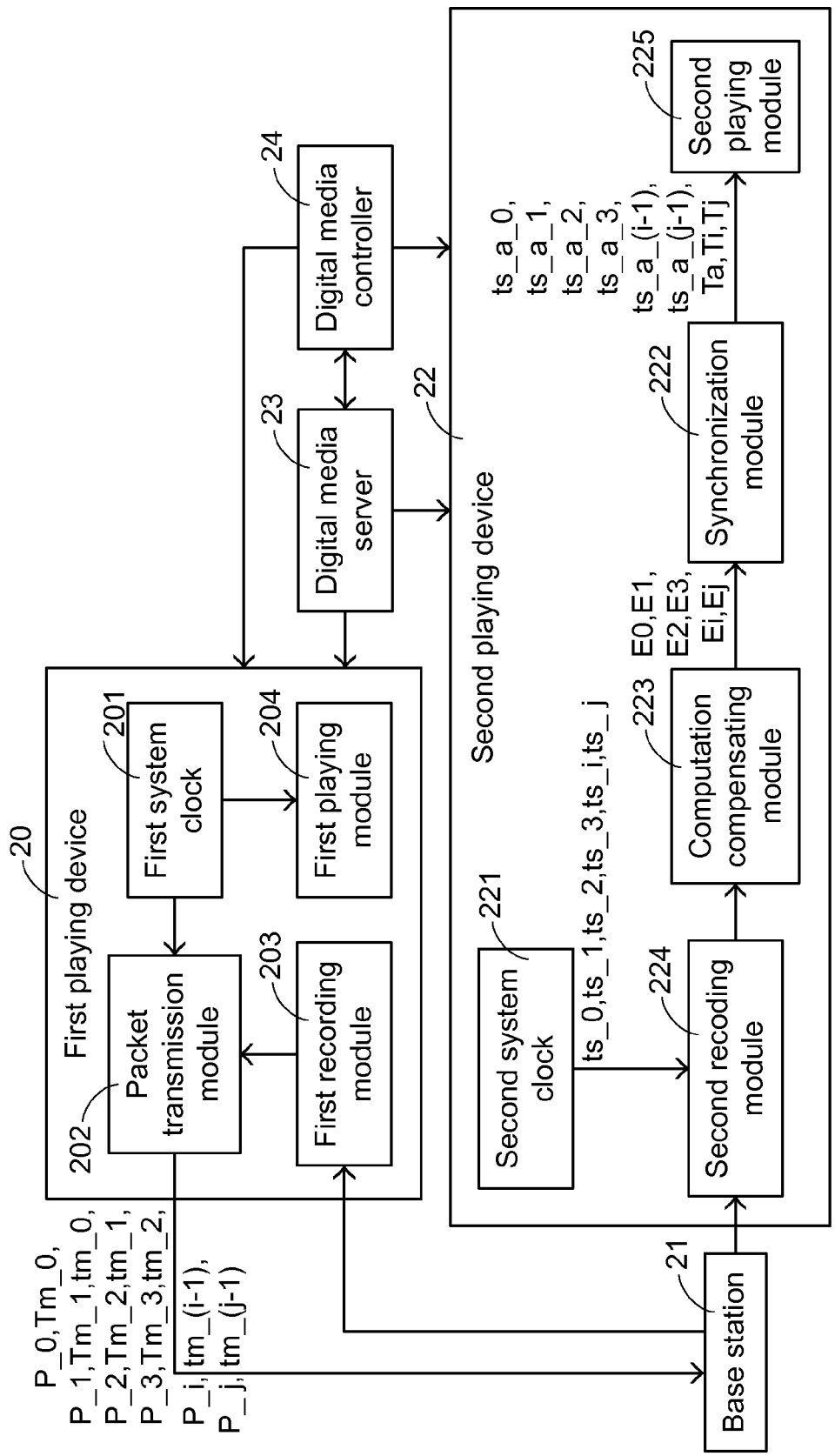
FIG. 2 is a schematic functional block diagram illustrating a time synchronization system according to an embodiment of the present invention.

The present invention provides a time synchronization method and a time synchronization system. Hereinafter, a time synchronization system according to an embodiment of the present invention will be illustrated with reference to FIG. 2. FIG. 2 is a schematic functional block diagram illustrating a time synchronization system according to an embodiment of the present invention.

The time synchronization system comprises a first playing device 20, a base station 21, a second playing device 22, a digital media server (DMS) 23, and a digital media controller (DMC) 24. The first playing device 20 comprises a first system clock 201, a packet transmission module 202, a first recording module 203, and a first playing module 204. The second playing device 22 comprises a second system clock 221, a synchronization module 222, a computation compensating module 223, a second recoding module 224, and a second playing module 225.

The packet transmission module 202 periodically issues a packet to the base station 21 every a fixed time interval (e.g. 0.3 ms). Then, the packet is broadcasted from the base station 21 to the first playing device 20 and the second playing device 22. A system time of the first system clock 201 of receiving the packet by the first playing device 20 is recorded into the first recording module 203. The system time of the first system clock 201 of receiving the packet by the first playing device 20, a system time of the first system clock 201 of transmitting the packet from the first playing device 20 and a system time of the second system clock 221 of receiving the packet by the second playing device 22 are recorded into the second recoding module 224.

In this embodiment, both of the first playing device 20 and the second playing device 22 are digital media renderers (DMR). Moreover, the first playing device 20, the second playing device 22, the digital media server 23, and the digital media controller 24 are in communication with a local area network including the base station 21. The time synchronization between one first playing device 20 and one second playing device 22 may be easily expanded to the time synchronization between one first playing device 20 and plural second playing devices 22 while retaining the teachings of the invention. For succinctness and brevity, the operations of two playing devices are described in this embodiment. In practice, the time synchronization system 2 may comprise two or more playing devices.

In this embodiment, the digital media server 23 provides at least one audio data of an audio file to the first playing device 20 and the second playing device 22 in a wireless transmission manner. Then, the at least one audio data of the audio file is played by the first playing module 204 of the first playing device 20 and the second playing module 225 of the second playing device 22.

Since the system time of the first playing device 20 and the system time of the second playing device 22 may be different, the audio playback of the first playing device 20 and the audio playback of the second playing device 22 are not always synchronized. Consequently, before the audio playback is started, the time of the second playing device 22 has to be synchronized with the time of the first playing device 20. Consequently, the audio playback of the first playing device 20 and the audio playback of the second playing device 22 can be synchronized.

Figure 3A:
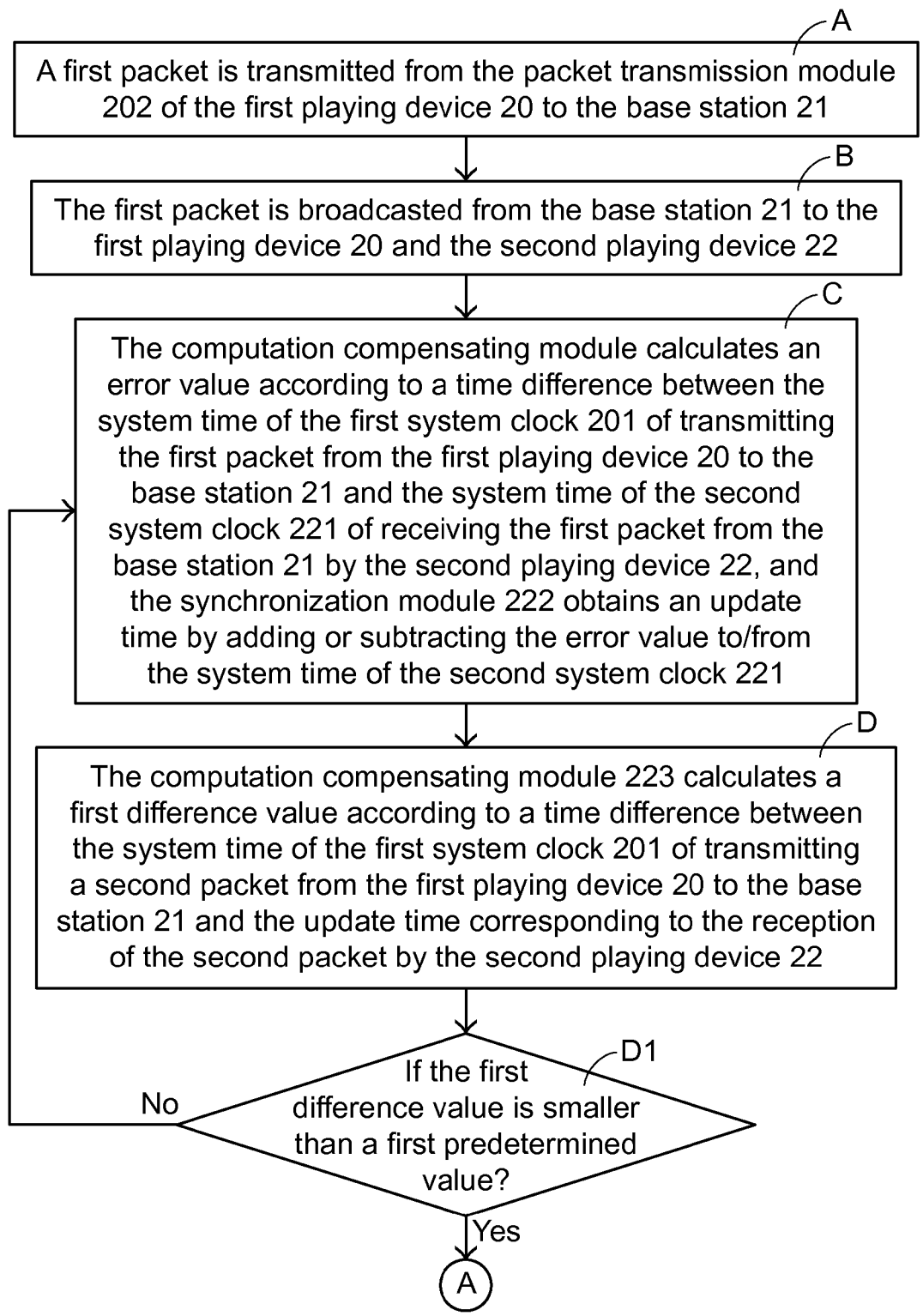
FIGS. 3A and 3B are a flowchart illustrating a time synchronization method according to an embodiment of the present invention.
Figure 3B:
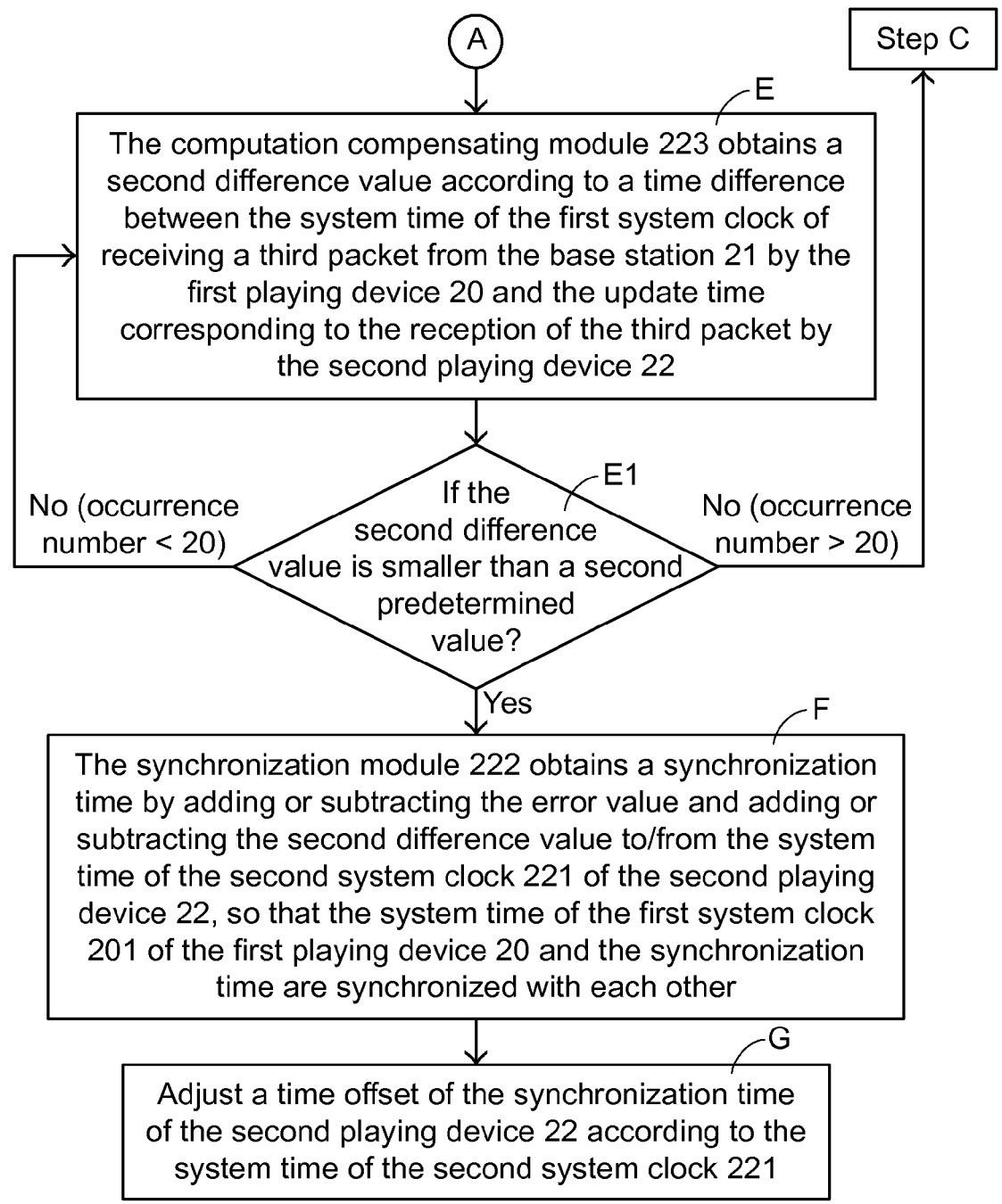
Figure 4:
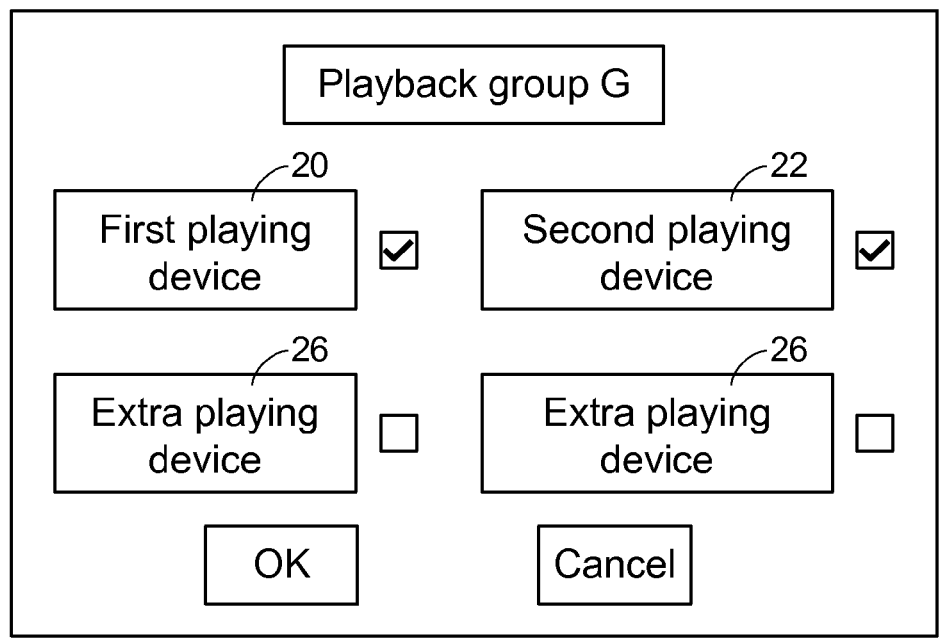
FIG. 4 schematically illustrates a playback group setting interface shown on the digital media controller of the time synchronization system according to the embodiment of the present invention.

Hereinafter, a time synchronization method will be illustrated with reference to FIGS. 2, 3A, 3B and 4. FIGS. 3A and 3B are a flowchart illustrating a time synchronization method according to an embodiment of the present invention. FIG. 4 schematically illustrates a playback group setting interface shown on the digital media controller of the time synchronization system according to the embodiment of the present invention.

After an application program of the digital media controller 24 is opened and a group setting item is clicked, a playback group setting interface 25 as shown in FIG. 4 is opened. In this embodiment, the digital media controller 24 is a mobile phone or a tablet computer. The application program is built in the digital media controller 41 or additionally installed by the user, but is not limited thereto. The contents of the playback group setting interface 25 as shown in FIG. 4 are presented herein for purpose of illustration and description only. That is, the contents of the playback group setting interface of the present invention are not restricted.

The playback group setting interface 25 comprises plural selective items about all DLNA-based playing devices in the same local area network. As shown in FIG. 4, the playback group setting interface 25 comprises plural selective items about the first playing device 20, the second playing device 22 and extra playing devices 26. Via the playback group setting interface 25, any playing device may be selected to be added to a playback group G, and a specified playing device may be set as a master playing device.

In this embodiment, the first playing device 20 and the second playing device 24 are selected to be added to the playback group G by the user, and the first playing device 20 is set as the master playing device. Since the first playing device 20 is the master playing device, the time synchronization of the second playing device 22 will follow the first playing device 20.

After the settings of the playback group are completed by the user, a step (A) is performed. In the step (A), a packet P_0 is transmitted from the packet transmission module 202 of the first playing device 20 to the base station 21. That packet P_0 contains the information about the system time Tm_0 of the first system clock 201 of transmitting the packet P_0 from the first playing device 20 to the base station 21. Then, in a step (B), the packet P_0 is broadcasted from the base station 21 to the first playing device 20 and the second playing device 22. The packet P_0 denotes a first packet.

After the packet P_0 is received by the second playing device 22, the step (C) is performed. In the step (C), an error value E0 is calculated by the computation compensating module 223. The error value E0 is a time difference between Tm_0 and ts_0, wherein Tm_0 is the system time of the first system clock 201 of transmitting the packet P_0 from the first playing device 20 to the base station 21 and ts_0 is the system time of the second system clock 221 of receiving the packet P_0 from the base station 21 by the second playing device 22. That is, the error value E0=|Tm_0−ts_0|. For example, in case that the system time Tm_0 of the first system clock 201 is 1'10" and the system time ts_0 of the second system clock 221 is 1'11", the error value E0 is 1 second.

Then, the error value E0 is transmitted to the synchronization module 222. By the synchronization module 222, the error value E0 is added to or subtracted from the system time ts_0 of the second system clock 221, so that an update time ts_a_0 is obtained. Under this circumstance, the time point of receiving the packet P_0 by the second playing device 22 and the system time Tm_0 of the first system clock 201 of transmitting the packet P_0 from the first playing device 20 are identical. Consequently, the time difference between the second playing device 22 and the first playing device 20 is reduced to the time period of broadcasting the packet P_0 to the base station 21 and broadcasting the packet P_0 from the base station 20 to the first playing device 20 and the second playing device 22. For example, in case that the system time Tm_0 of the first system clock 201 is 1'10" and the system time ts_0 of the second system clock 221 is 1'11", the update time ts_a_0 is 1'10" because the update time ts_a_0 is obtained by subtracting the error value E0 from the system time ts_0 of the second system clock 221.

After a next packet P_1 of the packet P_0 from the base station 21 is received by the second playing device 22, the error value E0 is added to or subtracted from the system time ts_1 of the second system clock 221. Consequently, the computation compensating module 223 obtains an update time ts_a_1 corresponding to the reception of the packet Pi by the second playing device 22. The packet Pi denotes a second packet. The packet P_1 contains the information about the system time Tm_1 of the first system clock 201 of transmitting the packet P_1 from the first playing device 20 to the base station 21 and the information about the system time tm_0 of the first system clock 201 of receiving the previous packet P_0 of the packet P_1 from the base station 21 by the first playing device 20.

For example, if the update time ts_a_0 is obtained by subtracting the error value E0 from the system time ts_0 of the second system clock 221, the update time ts_a_1 is also obtained by subtracting the error value E0 from the system time ts_1 of the second system clock 221.

As mentioned above, the update time ts_a_0 corresponding to the reception of the packet P_0 from the base station 21 by the second playing device 22 is identical to the system time Tm_0 of the first system clock 201 of transmitting the packet P_0 from the first playing device 20 to the base station 21. In the ideal situation, the update time ts_a_1 corresponding to the reception of the packet Pi by the second playing device 22 is identical to the system time Tm_1 of the first system clock 201 of transmitting the packet Pi from the first playing device 20 to the base station 21.

However, if the system and the network are instable or other problem occurs, the update time ts_a_1 and the system time Tm_1 may be different. For maintaining the system and network stability, a step (D) is performed. In the step (D), the computation compensating module 223 calculates a first difference value E1 between Tm_1 and ts_a_1, wherein Tm_1 is the system time of the first system clock 201 of transmitting the packet Pi from the first playing device 20 to the base station 21 and ts_a_1 is the update time corresponding to the reception of the packet Pi by the second playing device 22. That is, the first difference value E1=|Tm_1−ts_a_1|. Then, a step (D1) is performed to judge whether the first difference value E1 is smaller than a first predetermined value.

If the first difference value E1 is larger than the first predetermined value (e.g. 8 ms), it is determined that the system and the network are instable. Under this circumstance, the step (C) is repeatedly done until the system and the network are stable. Whereas, if the first difference value E1 is smaller than the first predetermined value (e.g. 8 ms), it is determined that the system and the network are temporarily stable.

For continuously maintaining the system and network stability, after a next packet P_2 of the packet P_1 from the base station 21 is received by the second playing device 22, the step (D) is repeatedly done. The computation compensating module 223 calculates another first difference value E2 between Tm_2 and ts_a_2, wherein Tm_2 is the system time of the first system clock 201 of transmitting the packet P_2 from the first playing device 20 to the base station 21 and ts_a_2 is the update time corresponding to the reception of the packet P_2 by the second playing device 22. That is, the first difference value E2=|Tm_2−ts_a_2|. Then, the step (D1) is repeatedly performed to judge whether the first difference value E2 is smaller than the first predetermined value. Moreover, the packet P_2 denotes a third packet.

Moreover, after the error value E0 is added to or subtracted from the system time ts_2 of the second system clock 221 corresponding to the reception of the packet P_2 by the second playing device 22, the update time ts_a_2 is obtained by the computation compensating module 223. For example, if the update time ts_a_1 is obtained by subtracting the error value E0 from the system time ts_1 of the second system clock 221, the update time ts_a_2 is also obtained by subtracting the error value E0 from the system time ts_2 of the second system clock 221.

The packet P_2 contains the information about the system time Tm_2 of the first system clock 201 of transmitting the packet P_2 from the first playing device 20 to the base station 21 and the information about the system time tm_1 of the first system clock 201 of receiving the previous packet P_1 of the packet P_2 from the base station 21 by the first playing device 20.

As mentioned above, the update time ts_a_0 corresponding to the reception of the packet P_0 from the base station 21 by the second playing device 22 is identical to the system time Tm_0 of the first system clock 201 of transmitting the packet P_0 from the first playing device 20 to the base station 21. In the ideal situation, the update time ts_a_2 corresponding to the reception of the packet P_2 by the second playing device 22 is identical to the system time Tm_2 of the first system clock 201 of transmitting the packet P_2 from the first playing device 20 to the base station 21. Consequently, if the system and the network are stable, the first difference value E2 must be smaller than the first predetermined value and close to or equal to 0. Whereas, if the first difference value E2 is larger than the first predetermined value, it is determined that the system and the network are temporarily unstable. Under this circumstance, the step (C) is repeatedly done until the system and the network are stable.

If both of the first difference value E1 and the first difference value E2 are smaller than the first predetermined value, it is determined that the system and the network are continuously stable. Consequently, the subsequent procedures may be performed. In this embodiment, the first predetermined value is 8 ms, and the number of times that the step (D) is performed (i.e. the number of used packets) is two. It is noted that first predetermined value may be varied according to the practical requirements and the number of times that the step (D) is performed may be varied according to the practical requirements.

After the above procedures, a next packet P_3 of the packet P_2 from the base station 21 is received by the second playing device 22. The error value E0 is added to or subtracted from the system time ts_3 of the second system clock 221 corresponding to the reception of the packet P_3 by the second playing device 22, so that the update time ts_a_3 is obtained by the computation compensating module 223. The packet P_3 denotes a fourth packet. The packet P_3 contains the information about the system time Tm_3 of the first system clock 201 of transmitting the packet P_3 from the first playing device 20 to the base station 21 and the information about the system time tm_2 of the first system clock 201 of receiving the previous packet P_2 of the packet P_3 from the base station 21 by the first playing device 20.

If the update time ts_a_1 is obtained by subtracting the error value E0 from the system time ts_1 of the second system clock 221, the update time ts_a_3 is also obtained by subtracting the error value E0 from the system time ts_3 of the second system clock 221.

Then, in the step (E), the computation compensating module 223 calculates a second difference value between the time points of receiving the same packet from the base station 21 by the first playing device 20 and the second playing device 22. As mentioned above, the packet P_3 contains the information about the system time tm_2 of the first system clock 201 of receiving the previous packet P_2 of the packet P_3 from the base station 21 by the first playing device 20. Consequently, after the packet P_3 is received, the computation compensating module 223 calculates the second difference value E3 between tm_2 and ts_a_2, wherein tm_2 is the system time of the first system clock 201 of receiving the packet P_2 by the first playing device 20 and ts_a_2 is the update time corresponding to the reception of the packet P_2 by the second playing device 22. That is, the second difference value E3=|tm_2−ts_a_2|. For example, in case that the system time tm_2 of the first system clock 201 of receiving the packet P_2 by the first playing device 20 is 1'20" and the update time ts_a_2 corresponding to the reception of the packet P_2 by the second playing device 22 is 1'21", the second difference value E3 is 1 second.

Since the packet P_2 is broadcasted from the base station 21 to both of the first playing device 20 and the second playing device 22 at the same time, the second difference value E3 denotes the time difference between the system time of the first system clock 201 of the first playing device 20 and the update time of the second playing device 22. The update time of the second playing device 22 is obtained by adding or subtracting the error value E0 to/from the system time of the second system clock 221. For synchronizing the system time of the second system clock 221 with the system time of the first system clock 201, the synchronization module 222 may obtain a synchronization time Ta by adding or subtracting the error value E0 and adding or subtracting the second difference value E3 to/from the system time of the second system clock 221 of the second playing device 22. Consequently, the synchronization time Ta and the system time of the first system clock 201 of the first playing device 20 are synchronized with each other. That is, the step (F) is performed.

In an example, the system time Tm_0 of the first system clock 201 of transmitting the packet P_0 from the first playing device 20 is 1'10", the system time ts_0 of the second system clock 221 of receiving the packet P_0 from the base station 21 by the second playing device 22 is 1'11", the system time tm_2 of the first system clock 201 of receiving the packet P_2 by the first playing device 20 is 1'20", and the update time ts_a_2 corresponding to the reception of the packet P_2 by the second playing device 22 is 1'21". Under this circumstance, both of the error value E0 and the second difference value E3 are 1 second. In addition, the synchronization time Ta is obtained by subtracting the error value E0 and subtracting the second difference value E3 from the system time of the second system clock 221.

In a step (E1), if the second difference value E3 is larger than a second predetermined value (e.g. 8 ms), the step (E) is repeatedly done but the step (F) is not subsequently performed. Moreover, if the number of times that the second difference value E3 is larger than the second predetermined value reaches a specified number (e.g. 20), the step (C) is repeatedly done in order to maintain the system and network stability.

It is noted that the packets used in the steps (C), (D) and (E) are not necessarily successive packets. For example, the second packet may be used in the step (C), the fourth packet and the fifth packet may be used in the step (D), and the seventh packet may be used in the step (E). These packets are presented herein for purpose of illustration and description only.

After the above synchronization process is completed, the user may operate the digital media controller 24 to control the audio playback of the playback group G. Under this circumstance, the audio playback of the first playing module 204 of the first playing device 20 and the audio playback of the second playing module 225 of the second playing device 22 are synchronized with each other according the system time of the first system clock 201 and the synchronization time Ta, respectively. The synchronization time Ta is obtained by adding or subtracting the error value E0 and adding or subtracting the second difference value E3 to/from the system time of the second system clock 221.

Generally, the system time of the first system clock 201 and the system time of the second system clock 221 are generated by the first playing device 20 and the second playing device 22 according to the clock signals provided by respective oscillators of the first playing device 20 and the second playing device 22. Due to the precisions of the oscillators, the system time of the first system clock 201 and the system time of the second system clock 221 have time errors after a certain time period. For example, an oscillator with a 1-ppm precision may have 1-second error after 1,000,000 seconds. Moreover, the network transmission speed is not always fixed. In accordance with the time synchronization method of the present invention, the steps (E) and (F) are repeatedly done in order to calculate the second difference value corresponding to the newly-received packet. Consequently, the synchronization time is updated. The synchronization time is obtained by subtracting the error value E0 and subtracting the second difference value from the system time of the second system clock 221.

Moreover, in addition to the above factors, the calculated second difference values corresponding to different packets are not fixed. Consequently, the time interval between one synchronization time and the adjacent synchronization time is possibly not equal to the time interval between two time points of the second system clock 221. For increasing the time synchronization precision, the time offset of the synchronization time may be adjusted according to the system time of the second system clock 221. An approach of adjusting the time offset of the synchronization time will be illustrated with a step (G).

Figure 5:
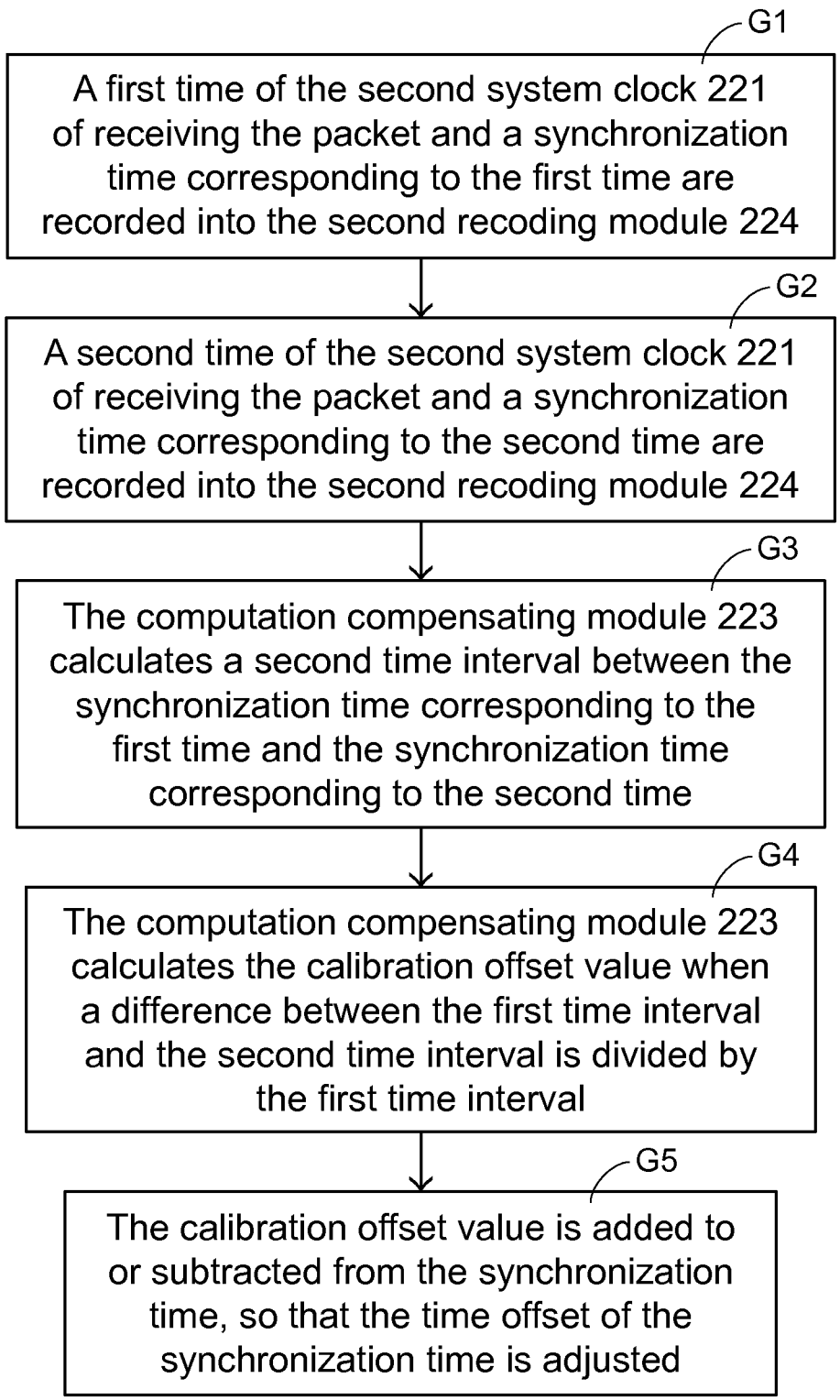
FIG. 5 is a flowchart illustrating the step (G) of the time synchronization method according to the embodiment of the present invention.

Please refer to FIGS. 3A, 3B and 5. FIG. 5 is a flowchart illustrating the step (G) of the time synchronization method according to the embodiment of the present invention.

Firstly, in a step (G1), a first time $ts\_i$ of the second system clock 221 of receiving the packet $P\_i$ and a synchronization time $Ti$ corresponding to the first time $ts\_i$ are recorded into the second recoding module 224. The packet $P\_i$ denotes the i-th packet.

The synchronization time $Ti$ corresponding to the first time $ts\_i$ is obtained by adding or subtracting the error value E0 and adding or subtracting the second difference value $Ei$ to/from the system time of the second system clock 221. The second difference value $Ei$ is the time difference between $tm\_(i-1)$ and $ts\_a\_(i-1)$, wherein $tm\_(i-1)$ is the system time of the first system clock 201 of receiving the previous packet of the packet $P\_i$ by the first playing device 20 and $ts\_a\_(i-1)$ is the update time corresponding to the reception of the previous packet of the packet $P\_i$ by the second playing device 22. That is, the second difference value $Ei=|tm\_(i-1)-ts\_a\_(i-1)|$.

Then, in a step (G2), a second time $ts\_j$ of the second system clock 221 of receiving the packet $P\_j$ and a synchronization time $Tj$ corresponding to the second time $ts\_j$ are recorded into the second recoding module 224. The packet $P\_j$ denotes the j-th packet.

A first time interval between the first time $ts\_i$ and the second time $ts\_j$ is equal to $(ts\_j-ts\_i)$. The synchronization time $Tj$ corresponding to the second time $ts\_j$ is obtained by adding or subtracting the error value E0 and adding or subtracting the second difference value $Ej$ to/from the system time of the second system clock 221. The second difference value $Ej$ is the time difference between $tm\_(j-1)$ and $ts\_a\_(j-1)$, wherein $tm\_(j-1)$ is the system time of the first system clock 201 of receiving the previous packet of the packet $P\_j$ by the first playing device 20 and $ts\_a\_(j-1)$ is the update time corresponding to the reception of the previous packet of the packet $P\_j$ by the second playing device 22. That is, the second difference value $Ei=|tm\_(j-1)-ts\_a\_(j-1)|$.

Then, in a step (G3), a second time interval between the synchronization time $Ti$ and the synchronization time $Tj$ (i.e. $Tj-Ti$) is calculated by the computation compensating module 223.

For example, if the first time interval is 300 seconds and the second time interval is 299 seconds, it means that the synchronization time $Tj$ has 1-second time offset after 300 seconds. Consequently, a calibration offset value of the synchronization time $Tj$ to be compensated is equal to the quotient from the division of 1 second by 300 seconds. That is, the step (G4) is performed.

Afterwards, in the step (G5), the calibration offset value is added to or subtracted from the synchronization time $Tj$ by the synchronization module 222. Consequently, the time offset of the synchronization time is adjusted.

From the above descriptions, a specified packet to be broadcasted contains the information about the system time of the first system clock 201 of transmitting the specified packet from the first playing device 20 and the system time of the first system clock 201 of receiving the previous packet of the specified packet by the first playing device 20. Since it is not necessary to allow the second playing device 22 to additionally retrieve the time point of receiving the packet from the first playing device 20, the process complexity is simplified.

Moreover, after the packet $P\_0$ is received, an update time is used by the second playing device 22. Consequently, the time difference between the second playing device 22 and the first playing device 20 is reduced to the time period of broadcasting the packet $P\_0$ to the base station 21 and broadcasting the packet $P\_0$ from the base station 20 to the first playing device 20 and the second playing device 22.

Moreover, the time synchronization method of the present invention further calculates the time differences between the time points of the first system clock 201 of broadcasting plural packets to the base station 21 and the update time corresponding to the reception of the packets by the second playing device 22. By judging whether the time differences are lower than the first predetermined value, the time synchronization method may realize whether the system and the network are stable. Consequently, the time errors resulting from system and network instability can be quickly converged. In other words, the time synchronization method and the time synchronization method of the present invention are faster and more precise.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A time synchronization method for synchronizing a first playing device and a second playing device of an area network, the area network comprising a base station, the first playing device having a first system clock, the second playing device having a second system clock, the time synchronization method comprising steps of:
   (A) transmitting a packet from the first playing device to the base station;
   (B) transmitting the packet from the base station to the first playing device and the second playing device;
   (C) after the packet is received by the second playing device, obtaining an update time by adding an error value to a system time of the second system clock or subtracting the error value from the system time of the second system clock, wherein the error value is a time difference between a time point of transmitting the packet from the first playing device to the base station and a time point of receiving the packet from the base station by the second playing device;
   (D) judging whether plural first difference values are all smaller than a first predetermined value, wherein if the plural first difference values are all smaller than the first predetermined value, a step (E) is performed, wherein each of the first difference values is a time difference between a time point of transmitting the same packet of plural consecutive packets from the first playing device to the base station and a time point of receiving the packet by the second playing device, wherein a system time of the first system clock is used by the first playing device, and the update time is used by the second playing device;
   (E) calculating plural second difference values, and judging whether the plural second difference values are all smaller than a second predetermined value, wherein if one of the plural second difference values is smaller than the second predetermined value, a step (F) is performed, wherein each of the second difference values is a time difference between time points of receiving the same packet from the base station by the first playing device and the second playing device, wherein the system time of the first system clock is used by the first playing device, and the update time is used by the second playing device; and
   (F) obtaining a synchronization time by adding the second difference value to the update time or subtracting the second difference value from the update time, so that the system time of the first system clock and the synchronization time are synchronized with each other.

2. The time synchronization method according to claim 1, wherein each packet from the first playing device contains an information about a time point of transmitting the packet from the first playing device to the base station and an information about a time point of receiving a previous packet of the packet from the base station by the first playing device.

3. The time synchronization method according to claim 1, wherein after the step (F), the time synchronization method further comprises a step of adjusting a time offset of the synchronization time of the second playing device according to the system time of the second system clock.

4. The time synchronization method according to claim 3, wherein the time offset of the synchronization time is adjusted by performing steps of:
   recording a first time of the second system clock and the synchronization time corresponding to the first time;
   after a first time interval of the second system clock, recording a second time of the second system clock at an end of the first time interval and recording the synchronization time corresponding to the second time;
   calculating a second time interval between the synchronization time corresponding to the first time and the synchronization time corresponding to the second time;
   calculating a calibration offset value, wherein the calibration offset value is obtained when a difference between the first time interval and the second time interval is divided by the first time interval; and
   adding the calibration offset value to the synchronization time or subtracting the calibration offset value from the synchronization time, so that the time offset of the synchronization time is adjusted.

5. A time synchronization system for synchronizing a first playing device and a second playing device of an area network, the area network comprising a base station, the first playing device having a first system clock, the second playing device having a second system clock, the time synchronization system comprising:
   the first playing device comprising a packet transmission module, wherein the packet transmission module transmits plural packets to the base station;
   the base station transmitting the plural packets to the first playing device and the second playing device; and
   the second playing device comprising:
      a synchronization module, wherein after one of the plural packets is received by the second playing device, an error value is added to or subtracted from a system time of the second system clock by the synchronization module, so that an update time is obtained, wherein the error value is a difference value between a time point of transmitting the packet from the first playing device to the base station and a time point of receiving the packet from the base station by the second playing device; and
      a computation compensating module calculating plural first difference values and judging whether the plural first difference values are all smaller than a first predetermined value, wherein if the plural first difference values are all smaller than the first predetermined value, the computation compensating module calculates plural second difference values and judges whether the plural second difference values are all smaller than a second predetermined value, wherein if one of the plural second difference values is smaller than the second predetermined value, the second difference value is added to or subtracted from the update time by synchronization module, so that a synchronization time is obtained and a system time of the first system clock is synchronized with the synchronization time,
      wherein each of the first difference values is a time difference between a time point of transmitting the same packet of the plural consecutive packets from the first playing device to the base station and a time point of receiving the packet by the second playing device, and each of the second difference values is a time difference between time points of receiving the same packet from the base station by the first playing device and the second playing device, wherein the system time of the first system clock is used by the first playing device, and the update time is used by the second playing device.

6. The time synchronization system according to claim 5, wherein each packet from the first playing device contains an information about a time point of transmitting the packet from the first playing device to the base station and an information about a time point of receiving a previous packet of the packet from the base station by the first playing device.

7. The time synchronization system according to claim 5, wherein the computation compensating module further adjusts a time offset of the synchronization time of the second playing device according to the system time of the second system clock.

8. The time synchronization system according to claim 7, wherein the computation compensating module records a first time of the second system clock and the synchronization time corresponding to the first time, wherein after a first time interval of the second system clock, the computation compensating module records a second time of the second system clock at an end of the first time interval and records the synchronization time corresponding to the second time, so that a second time interval and a calibration offset value are calculated, wherein the calibration offset value is added to or subtracted from the synchronization time, so that the time offset of the synchronization time is adjusted by the computation compensating module, wherein the second time interval is a time difference between the synchronization time corresponding to the first time and the synchronization time corresponding to the second time, and the calibration offset value is obtained when a difference between the first time interval and the second time interval is divided by the first time interval.

9. The time synchronization system according to claim 5, wherein the first playing device further comprises a first recording module, and the second playing device further comprises a second recording module, wherein the time points of the first system clock of receiving the plural packets by the first playing device are recorded into the first recording module, wherein the time points of the first system clock of receiving the plural packets by the first playing device, the time points of the first system clock of transmitting the plural packets from the first playing device and the time points of the second system clock of receiving the plural packets by the second playing device are recorded into the second recoding module.

\* \* \* \* \*